(12) United States Patent
Kelly et al.

(10) Patent No.: US 9,022,867 B2
(45) Date of Patent: May 5, 2015

(54) GAMING SYSTEM WITH TOURNAMENT COMMUNICATION PROTOCOLS

(75) Inventors: Bryan M. Kelly, Alamo, CA (US); Dennis Lockard, Tracy, CA (US); Jeffrey C. Tallcott, Pleasanton, CA (US); John G. Kroeckel, San Ramon, CA (US)

(73) Assignee: Bally Gaming, Inc., Las Vegas, NV (US)

( * ) Notice: Subject to any disclaimer, the term of this patent is extended or adjusted under 35 U.S.C. 154(b) by 1174 days.

(21) Appl. No.: 12/270,757

(22) Filed: Nov. 13, 2008

(65) Prior Publication Data

US 2009/0069092 A1    Mar. 12, 2009

Related U.S. Application Data

(63) Continuation-in-part of application No. 11/307,528, filed on Feb. 10, 2006, now Pat. No. 7,905,780, which is a continuation-in-part of application No. 10/943,771, filed on Sep. 16, 2004, now Pat. No. 7,950,999, application No. 12/270,757, filed on Nov. 13, 2008, which is a continuation-in-part of application No. 11/470,606, filed on Sep. 6, 2006, now Pat. No. 8,678,902, which is a continuation-in-part of application No. 11/225,770, filed on Sep. 12, 2005, now abandoned.

(60) Provisional application No. 60/714,754, filed on Sep. 7, 2005, provisional application No. 60/987,406, filed on Nov. 13, 2007.

(51) Int. Cl.
*A63F 13/30* (2014.01)
*G07F 17/32* (2006.01)
*G06Q 30/02* (2012.01)

(52) U.S. Cl.
CPC .............. *G07F 17/32* (2013.01); *G06Q 30/02* (2013.01); *G07F 17/3209* (2013.01); *G07F 17/3276* (2013.01)

(58) Field of Classification Search
USPC ..................................... 463/16, 17, 40–42
See application file for complete search history.

(56) References Cited

U.S. PATENT DOCUMENTS

| | | | |
|---|---|---|---|
| 6,464,583 B1 * | 10/2002 | Kidron | 463/25 |
| 7,950,999 B2 * | 5/2011 | Morrow et al. | 463/31 |
| 2002/0039923 A1 * | 4/2002 | Cannon et al. | 463/42 |

* cited by examiner

*Primary Examiner* — Ronald Laneau
*Assistant Examiner* — Ross Williams
(74) *Attorney, Agent, or Firm* — Brooke W. Quist; Marvin A. Hein; Philip J. Anderson

(57) ABSTRACT

Networked gaming systems and the communication protocols for presenting a network-based games or network-based tournament games are disclosed herein. According to one embodiment, the gaming system includes a plurality of gaming devices in communication with a tournament server. Each gaming device includes a base game and a secondary device having a display and a processor. The secondary device is operatively associated with the gaming device, and the secondary device enables a player to play a tournament game that is presented amongst one or more of the plurality of gaming devices. The secondary device is in communication with the tournament server through web service protocols. The tournament controller sends and receives player-related data and tournament-related data to and from one or more of the secondary devices participating in the tournament game.

16 Claims, 1 Drawing Sheet

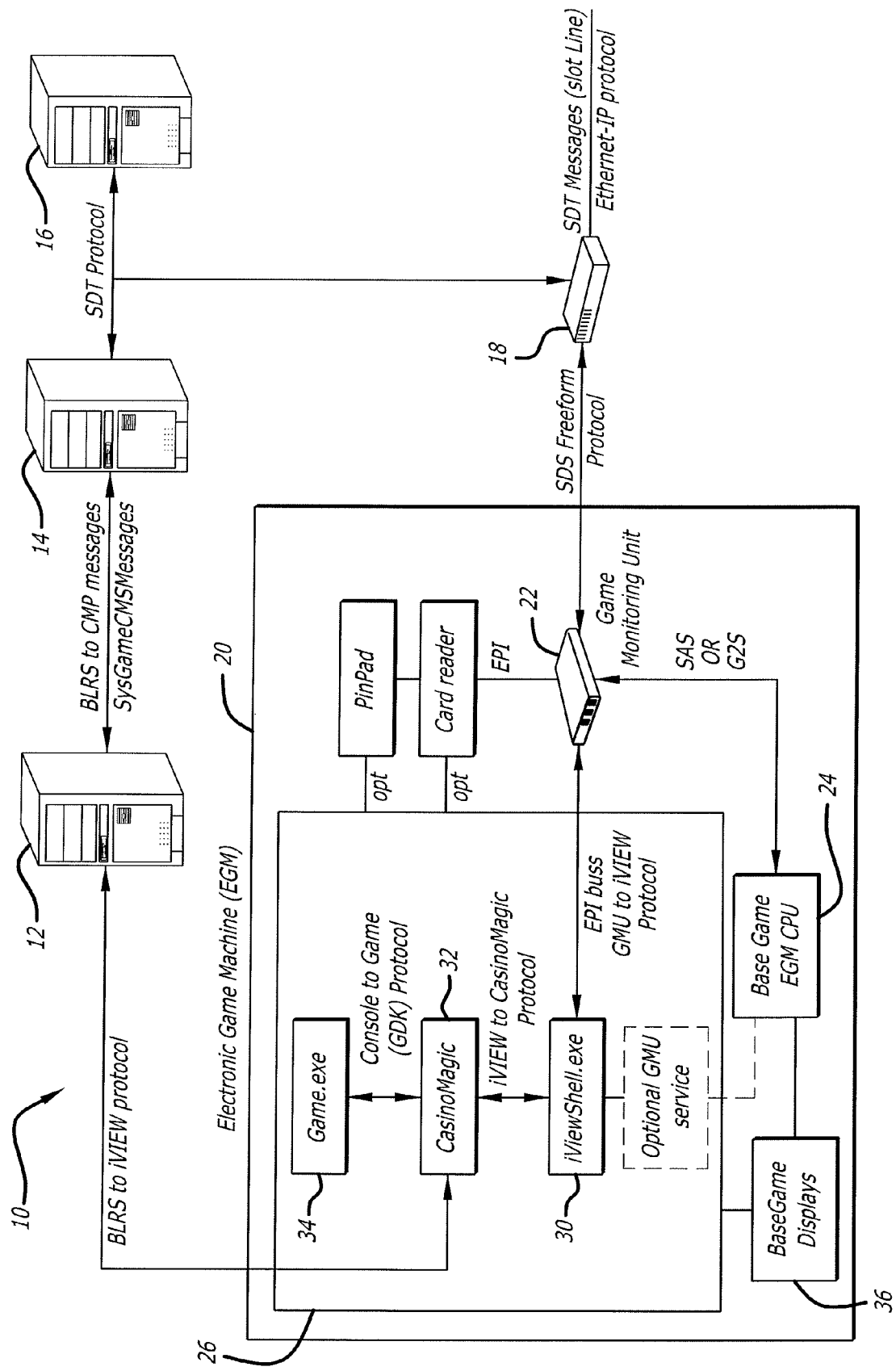

GAMING SYSTEM WITH TOURNAMENT COMMUNICATION PROTOCOLS

CROSS-REFERENCE TO RELATED APPLICATIONS

This application claims the benefit of U.S. Provisional Application No. 60/987,406, filed Nov. 13, 2007, which is hereby incorporated by reference.

This application is a continuation-in-part of U.S. patent application Ser. No. 11/307,528 filed Feb. 10, 2006, entitled USER INTERFACE SYSTEM AND METHOD, which is a continuation-in-part of U.S. patent application Ser. No. 10/943,771 filed Sep. 16, 2004, entitled USER INTERFACE SYSTEM AND METHOD FOR A GAMING MACHINE, both of which are hereby incorporated by reference.

This application is a continuation-in-part of U.S. patent application Ser. No. 11/470,606 filed Sep. 6, 2006, entitled SYSTEM GAMING, which claims the benefit of U.S. provisional patent application No. 60/714,754, filed Sep. 7, 2005, entitled SYSTEM GAMING APPARATUS AND METHOD, both of which are hereby incorporated by reference. U.S. patent application Ser. No. 11/470,606 is also a continuation-in-part of U.S. patent application Ser. No. 11/225,770 filed Sep. 12, 2005, entitled SYSTEM AND METHOD FOR GAMING-CONTENT CONFIGURATION AND MANAGEMENT SYSTEM, both of which are hereby incorporated herein by reference. U.S. patent application Ser. No. 11/470,606 is also related to co-pending U.S. patent application Ser. No. 11/470,605, filed Sep. 7, 2006.

This application is related to co-pending U.S. patent application Ser. No. 12/270,771 concurrently filed on Nov. 13, 2008, entitled GAMING SYSTEM WITH TOURNAMENT COMMUNICATION PROTOCOLS AND METHODS, which is hereby incorporated by reference.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

TECHNICAL FIELD

This description related to networked gaming systems and the communication protocols used within the network gaming system.

BACKGROUND

Networked gaming systems have been developed over the years. These networked gaming systems expand features available to players and to a casino operator (or other user). For example, player tracking systems provide awards and/or services to player based on game play. On the operations end, networked gaming systems allow a gaming establishment to be more efficient and utilize fewer resources for labor-intensive activities such as reconfiguring gaming machines, changing games on the gaming machines, or performing cash transactions for casino patrons. One or more servers or components are used to implement these various features. To facilitate communication between various components, numerous communication protocols may be implemented.

SUMMARY

Briefly, and in general terms, various embodiments are directed to gaming systems and the communication protocols for presenting a network-based games or network-based tournament games. According to one embodiment, the gaming system includes a plurality of gaming devices in communication with a tournament server. Each gaming device includes a base game and a secondary device having a display and a processor. The secondary device is operatively associated with the gaming device, and the secondary device enables a player to play a tournament game that is presented amongst one or more of the plurality of gaming devices. The secondary device is in communication with the tournament server through web service protocols. The tournament controller sends and receives player-related data and tournament-related data to and from one or more of the secondary devices participating in the tournament game.

Additionally, various player interface units are also disclosed herein. The player interface unit is operatively associated with a networked gaming device that has a gaming processor for controlling a game and a game display for presenting the game. According to one embodiment, the player interface unit includes a display screen for presenting information relating to a system-based, tournament game and an embedded processor that employs an internal operating system and communicates with the gaming processor and a tournament server. The embedded processor reads incoming data from the tournament server, wherein the embedded processor communicates with the tournament server via web service protocols.

In addition to gaming systems and player interface units, various methods for managing a tournament game in a gaming system are disclosed herein. According to one method, a player is identified at a gaming device. After the player is identified, the player interface unit receives player-related and tournament-related data from the tournament server, in which the player interface unit and the tournament server communicate via a web service protocol. The player unit interface increments a tournament counter in response to play of the base game, and play of the tournament game is initiated when the tournament counter reaches a predetermined value.

Other features and advantages will become apparent from the following detailed description, taken in conjunction with the accompanying drawings, which illustrate by way of example, the features of the various embodiments.

BRIEF DESCRIPTION OF THE DRAWINGS

FIG. 1 is block diagram of one embodiment of a gaming system capable of presenting a tournament game on a gaming machine.

DETAILED DESCRIPTION

Various embodiments are directed to networked gaming systems and the communication protocols for presenting a network-based game. The network-based game is provided through a game server on the gaming system, and the network-based game is presented on a gaming machine. Optionally, a tournament game is presented on the gaming machine through a tournament server. The gaming machine is able to communicate with the game server, tournament server, and various components within the gaming system via one or more communication protocols. For example, web service protocols allow components to communicate with one another.

Referring now to the drawings, wherein like reference numerals denote like or corresponding parts throughout the drawings and, more particularly to FIG. 1, there are shown one embodiment of a gaming system for presenting a network-based game. More specifically, as shown in FIG. 1, the gaming system 10 includes a player rewards server 12, a player marketing server 14, a slot system server 16, a bridge router 18, and a gaming machine 20. As shown in FIG. 1, the player rewards server 12 is in communication with the player marketing server 14. The player marketing server 14 is also in communication with slot system server 16 via a S_D_T_ (SDT) protocol. The player marketing server 14 and the slot system server 16 are in communication a game monitoring unit (GMU) 22 within the gaming machine 10 via a bridge router 18. As shown in FIG. 1, the game monitoring unit 22 may be located within the gaming machine 20. Alternatively, the game monitoring unit 22 is a component separate from the gaming machine.

According to one embodiment, the gaming machine 20 includes a processor board 24, such as an Alpha game board manufactured by Bally Gaming, Inc., in communication with the game monitoring unit 22. One or more displays 36 for the base (or primary game) are in communication with the processor board 24. Additionally, a player interface unit 26 including by way of example and not of limitation, an iVIEW manufactured by Bally Gaming, Inc., is also in communication with the game board 24, the player rewards server 12, and the game monitoring unit 22. According to one embodiment, the player rewards server 12 communicates with the player user interface 26 through web services over hypertext transfer protocol (http) or hypertext transfer protocol over secure socket layer (https). Optionally, the player interface unit 26 also includes a GMU service that is in communication with the processor board 24.

The player interface unit 26 includes its own separate processor board having one or more executable programs. As shown in FIG. 1, the player interface unit 26 includes operating system code 30 such as, but not limited to, Bally Gaming's iViewShell.exe. The player interface unit 26 may also include player rewards code 32 such as, but not limited to, Bally Gaming's CasinoMagic. Additionally, the player interface unit 26 includes game code 34 for presenting one or more games on the player interface unit. Optionally, the player interface unit 26 includes GMU-related code that provides an information channel between the player interface unit and both the GMU 22 and the processor board 24 of the gaming machine 20.

Optionally, the gaming machine 20 also include a card reader 28 and/or a keypad 30 that is in communication with the player interface unit 26 and the game monitoring unit 22. The card reader 28 receives a player tracking card (not shown) or other forms of identification issued to a player.

One of ordinary skill in the art will appreciate that not all gaming systems 10 or gaming machines 20 will have all these components and may have other components in addition to, or in lieu of, those components mentioned here. Furthermore, while these components are viewed and described separately, various components may be integrated into a single unit in some embodiments.

The following is list of definitions that are used to describe the communication protocols that are exchanged between the player rewards server 12 and the player interface unit 26. The player rewards server 12 is also referred herein as to the Bally Live Rewards Server (BLRS), tournament controller, or tournament server. Also, the player interface unit 26 is also referred to as an iVIEW, a player tracking user interface, or embedded user interface. The following table lists common definitions, acronyms and abbreviations that may be used to describe the various embodiments of the gaming system 10.

| Term | Description |
| --- | --- |
| BLRS | Bally Live Rewards Server, formally SGS—System Game Server |
| iVIEW | System Game client device, installed on base EGM—Electronic Gaming Machine |
| GID | Unique identifier of a System Game (e.g. 104—Blazing 7s) |
| HID | Unique identifier of a System Game Play associated with specific iVIEW, player card number, GID, SessionID, etc. |
| Bucket | A player account of certain currency type (like Cash, Bonus Points, Play Points, Threshold Counter, etc.) on BLRS. |
| Master Player Buckets | Master Player buckets contain all the funds for a player (identified with player card number). Only one set of Master Player buckets exists. |
| Session Buckets | When a player has his/her card inserted into an EGM with an iVIEW (opening a session with BLRS), all funds are moved from Master Player buckets to Session buckets. Multiple sets of Session buckets might exist at the same time. When card is removed (closing session with BLRS), all the funds from Session buckets are moved back to Master Player buckets. |

According to one embodiment, the system game server 12 communicates with an iVIEW 26 through web services over http or https. The following web service methods are provided by the system game server 12:

| Name | Purpose |
| --- | --- |
| registerIView | Register's the iVIEW with BLRS |
| getSGSDateTime | Returns the current BLRS Date time |
| getGlobalSettings | Returns the global settings for Live Reward Games |
| getAllPlayerSettings | Returns the player settings including available games, game start rules and play point accrual value for all the player types |
| postEventLog | Logs event message in to BLRS |
| getActivePayTableSets | Returns the active pay table sets, game settings for all the games and player types |
| getPayTableSet | Returns the requested pay table set object |
| unRegisterIView | Un registers the iVIEW with BLRS |
| SGS_CreateSession | Creates the Session for request player on a specified iVIEW and also returns whether the requested device is active or not. |
| SGS_ValidatePin | Validates the player PIN number with CMS/CMP |

-continued

| Name | Purpose |
|---|---|
| SGS_IsPlayerLocked | Verifies with the BLRS and returns whether the player is locked or not and also returns the time in minutes, how long that player will be locked. This is set after too many successive PIN verification failures |
| SGS_GetSessionBuckets | Returns the all player current session bucket balance values |
| SGS_Deposit | Deposits earned by a player session bucket values into the BLRS. |
| SGS_StartWithdrawal | Initiates the withdrawal transaction with BLRS for a session bucket value in BLRS |
| SGS_EndWithdrawal | Closes the opened withdrawal transaction |
| SGS_BeginGame | Initiates the begin game transaction with BLRS |
| SGS_BeginGameWithDeposits | Combined SGS_BeginGame and SGS_Deposit call |
| SGS_ProcessTournIntermediateScore | Performs intermediate score processing for a tournament game |
| SGS_EndGame | Closes the opened game play transaction |
| SGS_StartHandpay | Imitates the hand pay transaction with BLRS |
| SGS_EndHandpay | Closes the opened Hand pay |
| SGS_CloseSession | Closes the opened session |
| SGS_EGMGamePlay | Posts the EGM activity. i.e., total coin In, total coin Out and No-of games played to BLRS. |
| SGS_QueryGameplayLog | Returns the game play transactions log for the requested device |
| SGS_QueryWithdrawals | Returns the withdrawal transactions log for the requested device |
| SGS_QueryHandpayLog | Returns the hand pay transactions log for the requested device |
| SGS_GetPrizeTypes | Returns all available on BLRS prize types |

All web services will return an object. All return objects inherit from the same base class and therefore always contain the following fields:

| Response Parameter Name | Purpose |
|---|---|
| Result | Call result: 0-success, non-zero-failure |
| errorString | Error description (empty if success) |

The following are possible error descriptions and error codes that may be included in a return object:

| Error Description | Error Code |
|---|---|
| GENERIC_SYSTEM_ERROR | −1 |
| SUCCESS | 0 |
| SUCCESS_WITH_DUPLICATE_TRANSACTION | 1 |
| INVALID_PARAMS | 2 |
| AUTHORIZATION_FAILURE | 3 |
| SESSION_ID_INVALID | 10 |
| SESSION_SUSPENDED | 11 |
| SESSION_CLOSED | 12 |
| SESSION_VALIDATION_FAILURE | 13 |
| SESSION_CLOSE_FAILURE_PENDING_TRANSACTIONS | 14 |
| INSUFFICIENT_FUNDS | 20 |
| INVALID_SESSSION_DEPOSIT_NUMBER | 21 |
| INVALID_SESSSION_WITHDROWAL_NUMBER | 22 |
| TRANSACTION_ID_INVALID | 23 |
| TRANSACTION_VALIDATION_FAILURE | 24 |
| ATTEMPT_TO_ROLLBACK_COMMITED_TRANSACTION | 25 |
| ATTEMPT_TO_COMMIT_ROLLEDBACK_TRANSACTION | 26 |
| NON_JURISDICTION_WITHDRAWALS_ONLY | 27 |
| JURISDICTION_WITHDRAWALS_ONLY | 28 |
| INVALID_HANDPAY_ID | 40 |
| HANDPAY_VALIDATION_FAILURE | 41 |
| ATTEMPT_TO_COMPLETE_CANCELLED_HANDPAY | 42 |

-continued

| Error Description | Error Code |
|---|---|
| ATTEMPT_TO_CANCEL_COMPLETED_HANDPAY | 43 |
| ATTEMPT_TO_COMPLETE_COMPLETED_HANDPAY | 44 |
| NO_ASSET_NUMBER_FOUND | 60 |
| NO_GAME_SERIAL_NUMBER_FOUND | 61 |
| CMS_FUNCTION_FAILED | 70 |
| INVALID_HID | 80 |
| TOURNAMENT_BEGIN_GAME_FAILED | 81 |
| BEGIN_GAME_WITH_DEPOSITS_DEPOSIT_FAILED | 82 |
| BEGIN_GAME_WITH_DEPOSITS_BEGIN_GAME_FAILED | 83 |
| LAST_ERROR | 10000 |

Web Service: registerIView

The purpose of this message is to create a unique iVIEW identification (Id) on the Live Rewards Server 12. If the iVIEW Id (machine address of a device) already exists in the BLRS database, all the associated data from previous registration call is logged into a separate (history) table and then current information is updated. Registration data associated with iVIEW Id provides detailed information about the player interface unit, its location, and various metrics.

The following table is data that the iVIEW 26 may obtain from the GMU 22.

| | Purpose | Type/Range |
|---|---|---|
| Request Parameter Name | | |
| iviewId | Machine address of iVIEW device | 0-50 characters |
| casinoId | Unique for each casino | 0-4 characters |
| gameSerialNo | Serial number of cabinet | 0-40 characters |
| gameId | Manufacturer type | 0-5 characters |
| payTableId | Unique Pay Table Id | 0-6 characters |
| basePer | Theoretical pay back | 0-10 characters |
| gmuTime | Gmu time | 0-6 characters |
| maxBet | Max bet for game | 0-12 characters |
| gmuId | Gmu network address | 0-32 characters |
| protocolVersion | Version number of protocol | 0-16 characters |
| enableFeatures | SAS related bit mapped field of features the game has enabled | 0-6 characters |
| gameType | Type of ecash game | 0-3 characters |
| Enable | Enable or disable Live Rewards Game messaging | True/False |
| Denomination | Game play credit value in pennies | 0-12 characters |
| totalCoinIn | Coin-in game meter in pennies | 0-12 characters |
| totalCoinOut | Coin-out game meter in pennies | 0-12 characters |
| gamesPlayed | Number of games played | 0-12 characters |
| assetId | Unique identifier to the casino for the cabinet | 0-8 characters |

-continued

| | Purpose | Type/Range |
|---|---|---|
| Response Parameter Name | | |
| isActive | iVIEW device is active or not in the BLRS | True/False |
| Result | Call result: 0-success, non-zero-failure | Int |
| errorString | Error description | 0-1000 characters |

Web Service: getSGSDateTime

The purpose of the getSGSDateTime message is to synchronize the iVIEW device clock with the Live Rewards Server clock. This message returns the current Live Rewards Server 12 date and time. The following are tables of the possible request and response parameters for the getSGSDateTime service call and their corresponding purpose and type/range.

| Request Parameter Name | Purpose | Type/Range |
|---|---|---|
| None | | |
| Result | Call result: 0 - success, non-zero - failure | Int |
| errorString | Error description | 0-1000 characters |
| CurrentDateTime | Current Live Rewards Server date and time | Date and time object |

Web Service: getGlobalSettings

Depending on the settings defined on the server side 12, the purpose of this message is to control the "Live Rewards" games and/or the iVIEW 26. The getGlobalSettings web service returns the Global settings (i.e., those settings common for all the player interface units 26) as defined on the Live Rewards Server 12. The following is table of some exemplary request parameters, the purpose of the request parameters, and the type/range of the request parameters for getGlobalSettings web service. Additionally, a table presenting exemplary embodiments of global setting parameters, the purpose of the global setting parameters, and the type/range of the global setting parameters.

| Request Parameter Name | Purpose | Type/Range |
|---|---|---|
| IviewId | Machine address of iVIEW device | 0-50 characters |
| Response Parameter Name | | |
| Result | Call result: 0 - success, non-zero - failure | Int |
| errorString | Error description | 0-1000 characters |
| Global Settings object | Contains global settings (see below) | |
| Global Settings members | | |
| iviewResyncInt | iVIEW re-sync interval rate in mins for iVIEW to request the global settings, active pay table sets and player type settings from BLRS. | Int |
| sysGameVolume | Live Rewards game volume in percentage | Int |
| attractVolume | iVIEW attract mode volume in percentage | Int |
| autoPlayYesNo | True - auto play enabled, False - auto play disabled | True/False |
| *tiltTime | Time in minutes to tilt the system games | Int |
| *autoRemoveplayPoints | Time in minutes to clear not used Live Rewards game play points on the device. 0 = this feature is OFF | Int |
| jurisdictionLimit | Array of Prize Type Limit objects. Each object contains prize type Id and limit number. If the limit is exceeded by a single game win, a hand pay event is triggered | Decimal |
| playerCardFormat | A character string used by iVIEW as a mask on player card number reported by GMU. This is required for proper communications with CMP/CMS. | 0-20 characters |
| cashoutType | Defines if cash funds in player's account are cashable (1) or restricted (2). "Restricted" signifies that a player has to spend the funds on system game. A player with cash amounts in his player buckets will either have restricted (promotional) or cashable credits transferred based on this setting. | Int |
| databankLog_Enabled | Controls whether iVIEW should perform base game activity logging to a DataBank database. DataBank logging is used for creating game volatility tables which essential for normalized tournament scoring. Also, DataBank data will enable player-centric gaming providing game activity repository. | True/False |

Web Service: getAllPlayersSettings

The getAllPlayersSettings web service returns the player settings including accrual rate, Live Rewards game start threshold counter, and Live Rewards game start rules for all the player types/ranks (e.g., Platinum, Gold, or Silver level players) defined on the rewards server 12. The following are tables of the some embodiments of a request parameters, response parameters, and player settings.

| Request Parameter Name | Purpose | Type/Range |
|---|---|---|
| IviewId | Machine address of iVIEW device | 0-50 characters |
| Response Parameter Name | | |
| Result | Call result: 0 - success, non-zero - failure | Int |
| errorString | Error description | 0-1000 characters |
| Player Settings | Array of player setting objects | |

| | Purpose | Type/Range |
|---|---|---|
| Player Settings Members | | |
| playerType | Player type Id (Gold, Silver, etc) | Int |
| description | Description of player type (platinum, gold, silver . . . ) | 0-20 characters |
| accrualRate | Play points accrual percentage (of wagers) | Decimal |
| sysGameStartThreshold | System game start threshold counter (TC). This number should be achieved by a player in order to authorize a system game. | Int |
| sysGameStartRules | iVIEW utilizes these rules for accruing Play Points and Threshold Counter Points (TCs). Different player types might use different accrual rules. For instance, a rule with RuleID "01" and event description "Normal Base Game play" specifies accrual increment value of 1 and occurrence counter of 1. Which means that every base game-play, a player will have his TCs incremented by 1. Now, let's say a rule with RuleID "02" and event description "Base Game Max Bet" specifies accrual increment value of 20 and occurrence counter of 1. This means that if a player will have his TCs incremented by 20 every time he plays Max Bet on a base game. Array of Rules. Each Rule contains | |
| | Rule Id | Int |
| | Rule Description | 0-20 characters |
| | Occurrence counter | Int |
| | Increment Value | Int |
| availableGames | These are games available for this player type Actual executables of the games and all the assets for them are preloaded onto iVIEW but only the ones brought with this call will be enabled and presented to this player. Optionally, the games can be downloaded dynamically upon player selection. Array of Game objects. Each object contains | 0-4 characters |
| | Game ID | |
| | Game Name | 0-50 characters |
| | Game Type (Classic, Tournament, etc.) | Int |

Web Service: postEventLog

This message's purpose is storing the messages (the logs, error logs, events, or other information) received from the player interface unit 26 into the database (not shown) of the rewards server 12. For example, tilt messages on the player interface unit 26 may be stored in the database of the rewards server 12. The following tables are the request and response parameters for the postEventLog service call.

| | Purpose | Type/Range |
|---|---|---|
| Request Parameter Name | | |
| eventType | Type of the event (0 - Error, 1 - Info, 2 - debug) | 0-10 characters |
| iviewId | Machine address of a iVIEW device | 0-50 characters |
| assetId | Asset number assigned to this device or slot/base game | 0-8 characters |

| | Purpose | Type/Range |
|---|---|---|
| errCode | Error code defined by the iVIEW if any | 0-20 characters |
| Data | Information/message about the event | 0-200 characters |
| Response Parameter Name | | |
| Result | Call result: 0 - success, non-zero - failure | Int |
| errorString | Error description | 0-1000 characters |

Web Service: unRegisterIView

This message un-registers (deactivates) an active iVIEW 26 from the rewards server 12. According to one embodiment, reactivation of an un-registered iVIEW 26 requires manual input by an operator at the rewards server 12. The following table lists exemplary request and response parameters and their corresponding purpose and type/range.

| | Purpose | Type/Range |
|---|---|---|
| Request Parameter Name | | |
| iviewId | Machine address of a iVIEW device | 0-50 characters |
| Response Parameter Name | | |
| Result | Call result: 0 - success, non-zero - failure | Int |
| errorString | Error description | 0-1000 characters |

Web Service: getActivePayTableSets

This web service message includes all the active pay table sets and game settings for system games based on player types (e.g., Platinum, Gold, or Silver levels) as defined by the rewards server 12. Each pay table in a pay table set contains the required Play Points, cost, and game settings file. A player is required to earn Play Points matching or exceeding Play Points cost value for the appropriate pay table in order for a player to be eligible to play a system game. Accordingly, prior the start of the system game, the pay table based on the player rank is established via the web service message, getActivePayTableSets. The following are tables of exemplary request and response parameters for the getActivePayTableSets web service.

| | Purpose | Type/Range |
|---|---|---|
| Request Parameter Name | | |
| iviewId | Machine address of a iVIEW device | 0-50 characters |
| Response Parameter Name | | |
| PTabSets | All pay table sets | XML Node |
| Result | Call result: 0 - success, non-zero - failure | Int |
| errorString | Error description | 0-1000 characters |

Web Service: getPayTableSet

This web service returns the requested pay table set object from BLRS 12 for a specific PayTableSetId. The following tables list exemplary request and response parameters and their corresponding purpose and type/range.

| | Purpose | Type/Range |
|---|---|---|
| Request Parameter Name | | |
| PayTableSetId | Pay table set Id | Int |
| Response Parameter Name | | |
| PTabSets | pay table set | XML Node |
| Result | Call result: 0 - success, non-zero - failure | Int |
| errorString | Error description | 0-1000 characters |

Web Service: SGS_CreateSession

In one embodiment, upon insertion of a player card into gaming machine (or electronic gaming machine (EGM)), the player interface unit 26 performs a call to create a unique Session Id for the identified player on the specific player interface unit. This call creates the foundation for all system game communications between the player interface unit 26 and the rewards server 12 because all calls by the player interface unit to rewards server (between card-in and card-out events) will contain this unique Session Id.

When a Session Id is created, BLRS 12 also creates player-specific Session buckets (explained below) that are associated with the Session Id. The rewards server 12 moves all funds available in the Master Player buckets into the Session buckets. In case of multiple identical player cards inserted into multiple gaming machines 20, only the Session buckets for the earliest Session Id will contain complete balances of the Master Player buckets. The buckets for subsequently created sessions will start with zero balances.

When a player card is removed from an EGM 20, a SGS_CloseSession call is performed which closes (deactivates) the session and moves all the balances from Session buckets back into Master Player buckets.

A bucket, as defined and used herein, is an account of certain currency type such as, but not limited to, cash, bonus points, play points, or threshold counter values. Buckets are used to hold the balances of these respective currencies for any purpose utilized by the BLRS 12. For example, the buckets are used to accrue play points and threshold counter values that are used to trigger tournament games. Alternatively, the buckets may be used in player transactions to spend play points on play of a system game. In another embodiment, the buckets are used to hold player's winnings (e.g., separate buckets for cash and/or bonus points). The following tables list exemplary request and response parameters associated with the SGS_CreateSession web service and their corresponding purpose and type/range.

| | Purpose | Type/Range |
|---|---|---|
| Request Parameter Name | | |
| iviewId | Machine address of a iVIEW device | 0-50 characters |
| plrCardNo | Player Card Number | 0-20 characters |
| Response Parameter Name | | |
| sessionId | A unique session Id | Int |
| Buckets | An array of buckets objects. Each bucket contains | |
| | prizeTypeId | Int |
| | jurisdiction | True/False |
| | TRX_Value | Decimal |
| | Balance | Decimal |
| PlayerData | Player Data object contains | |
| | plrCardNo | 0-20 characters |
| | playerType | Int |
| | banned | True/False |
| IsDeviceActive | Whether the requested iVIEW device is active or not | True/False |
| Result | Call result: 0 - success, non-zero - failure | Int |
| errorString | Error description | 0-1000 characters |

| | Purpose | Type/Range |
|---|---|---|
| Request Parameter Name | | |
| iviewId | Machine address of a iVIEW device | 0-50 characters |
| plrCardNo | Player Card Number | 0-20 characters |
| Pin | Pin number | UN KNOWN |
| Response Parameter Name | | |
| pinStatus | Valid or Not | True/False |
| isLocked | Locked or Not | True/False |
| lockTimeinMins | Lock time in minutes | Int |
| Result | Call result: 0 - success, non-zero - failure | Int |
| errorString | Error description | 0-1000 characters |
| Request Parameter Name | | |
| iviewId | Machine address of a iVIEW device | 0-50 characters |
| plrCardNo | Player Card Number | 0-20 characters |
| Response Parameter Name | | |
| isLocked | Locked or Not | True/False |
| lockTimeinMins | Lock time in minutes | Int |
| Result | Call result: 0 - success, non-zero - failure | Int |
| errorString | Error description | 0-1000 characters |

Web Service: SGS_ValidatePin

This web service verifies whether a player personal identification number (PIN) is correct (or incorrect) through the marketing servers 14. PIN validation is necessary to authorize withdrawals of funds from the BLRS 12 to the iVIEW 26 or the base game CPU 24. The following tables list exemplary request and response parameters associated with the SGS_ValidatePin web service call and their corresponding purpose and type/range.

Web Service: SGS_IsPlayerLocked

This web service is used to determine whether the identified player is locked or not "locked" in BLRS 12. If the player is "locked," the web service returns lock time in minutes. This web service is used to prevent a player from cashing out from a player account until a lock time has expired. Also, this web service is used to prevent a player from defeating a PIN validation at cashout. The following tables list exemplary request and response parameters associated with the SGS_IsPlayerLocked web service calls and their corresponding purpose and type/range.

Web Service: SGS_GetSessionBuckets

This service call returns the requested player Session Bucket values from reserved buckets (session buckets). The following tables list exemplary request and response parameters associated with the service calls and their corresponding purpose and type/range.

| | Purpose | Type/Range |
|---|---|---|
| Request Parameter Name | | |
| iviewId | Machine address of a iVIEW device | 0-50 characters |
| plrCardNo | Player Card Number | 0-20 characters |
| sessionId | Session Number | Int |
| Response Parameter Name | | |
| Buckets | An array of buckets. Each bucket contains | |
| | prizeTypeId | Int |
| | jurisdiction | True/False |
| | TRX_Value | Decimal |
| | Balance | Decimal |
| Result | Call result: 0 - success, non-zero - failure | Int |
| errorString | Error description | 0-1000 characters |

Web Service: SGS_Deposit

The purpose of the SGS_Deposit web service call is to deposit the earned values (during game play) into the player's Session buckets and to return the newly updates balances to the player user interface 26. Typically, the buckets getting deposits are recently accrued Play Points and threshold counter values. This call is performed periodically (e.g., about every 90 seconds) or upon certain events such as, but not limited to, player tracking card-out or the start of a system game. The following tables list exemplary request and response parameters associated with the SGS_Deposit web service and their corresponding purpose and type/range.

| | Purpose | Type/Range |
|---|---|---|
| Request Parameter Name | | |
| iviewId | Machine address of a iVIEW device | 0-50 characters |
| plrCardNo | Player Card Number | 0-20 characters |
| sessionId | Session Number | Int |
| depositNumber | Deposit counter number | Int |
| Buckets | An array of buckets. Each bucket contains | |
| | prizeTypeId | Int |
| | jurisdiction | True/False |
| | TRX_Value | Decimal |
| | Balance | Decimal |
| Response Parameter Name | | |
| Buckets | An array of buckets. Each bucket contains | |
| | prizeTypeId | Int |
| | jurisdiction | True/False |
| | TRX_Value | Decimal |
| | Balance | Decimal |
| Result | Call result: 0 - success, non-zero - failure | Int |
| errorString | Error description | 0-1000 characters |

Web Service: SGS_StartWithdrawal

This web service initiates the withdrawal transaction for a requested bucket. This web service also returns a BLRS Transaction Number to store in the logs of the slot system 16 and base game for audit reasons. The following tables list exemplary request and response parameters associated with the SGS_StartWithdrawal web service call and their corresponding purpose and type/range.

| | Purpose | Type/Range |
|---|---|---|
| Request Parameter Name | | |
| iviewId | Machine address of a iVIEW device | 0-50 characters |
| plrCardNo | Player Card Number | 0-20 characters |
| sessionId | Session Number | Int |
| withdrawalNumber | Withdrawal counter number | Int |
| Bucket | Bucket contains | |
| prizeTypeId | | Int |
| jurisdiction | | True/False |
| TRX_Value | | Decimal |
| Balance | | Decimal |
| Response Parameter Name | | |
| SGS_TransactionID | BLRS Transaction Number to store in the SDS | Int |
| Result | Call result: 0 - success, non-zero - failure | Int |
| errorString | Error description | 0-1000 characters |
| Buckets | An array of buckets. Each bucket contains | |
| prizeTypeId | | Int |
| jurisdiction | | True/False |
| TRX_Value | | Decimal |
| Balance | | Decimal |

Web Service: SGS_EndWithdrawal

This web service completes the withdrawal transaction for a requested bucket and a unique transaction number and amount are issued. If the amount is different than the Start amount, the balance will deposited back to the player account. In some embodiments, the base game will only accept a partial transfer of a desired amount. The successfully transferred amount is logged on BLRS 12, SDS 16 and the base game 24. In the case of a partial transfer, the remaining funds stay in player's session buckets. The following tables list exemplary request and response parameters associated with the SGS_EndWithdrawal web service call and their corresponding purpose and type/range.

| | Purpose | Type/Range |
|---|---|---|
| Request Parameter Name | | |
| iviewId | Machine address of a iVIEW device | 0-50 characters |
| plrCardNo | Player Card Number | 0-20 characters |
| sessionId | Session Number | Int |
| SGS_TransactionID | BLRS Transaction Number | Int |
| isCommit | Commit or Rollback | True/False |
| TRX_Value | Transaction Value to commit or rollback | Decimal |
| Response Parameter Name | | |
| SGS_TransactionID | BLRS Transaction Number to store in the SDS | Int |
| Result | Call result: 0 - success, non-zero - failure | Int |
| errorString | Error description | 0-1000 characters |

Web Service: SGS_BeginGame

This web service creates a unique game play history identification (HID) and debits the requested buckets transaction values from player's session buckets. On the rewards server 12, the HID serves as a unique identifier of a system game played by a player. HID is also used by other calls such as, but not limited to, SGS_ProcessTournamentIntermediateScore and SGS_EndGame to update the score achieved during the game as well as perform tournament processing and winnings distribution (if necessary).

For tournament games, this call performs additional processing for an associated tournament instance (e.g., tournInstID field in the Gameplay object). In particular, the SGS_BeginGame call will bind a newly created HID with a specific tournament instance ID, which guarantees that the score from this game (HID) will be processed against that tournament instance. The following tables list exemplary request and response parameters associated with the SGS_BeginGame web service call and their corresponding purpose and type/range.

| | Purpose | Type/Range |
|---|---|---|
| Request Parameter Name | | |
| GamePlay | Gameplay object contains | |
| HID | | Int |
| GID | | 0-4 characters |
| IviewId | | 0-50 characters |
| plrCardNo | | 0-20 characters |
| sessionId | | Int |
| casinoId | | 0-4 characters |
| gmuId | | 0-32 characters |
| assetNo | | 0-8 characters |
| startDateTime | | Date time |
| payTabSetId | | Int |
| payTabId | | Int |
| gameSettingsId | | Int |
| score | | Int |
| tournInstID (unique tournament identifier, for tournament games only) | | Int |
| Array of Buckets. each bucket contains | | |
| prizeTypeId | | Int |
| jurisdiction | | True/False |
| TRX_Value | | Decimal |
| Balance | | Decimal |
| Response Parameter Name | | |
| HID | Game play History Id | Int |
| Buckets | An array of buckets. Each bucket contains | |
| prizeTypeId | | Int |
| jurisdiction | | True/False |
| TRX_Value | | Decimal |
| Balance | | Decimal |
| G2SMessage | A serialized G2S message which contains tournament end conditions (G2S tournamentInfo class) | 0-400 characters |
| Result | Call result: 0 - success, non-zero - failure | Int |
| errorString | Error description | 0-1000 characters |

Web Service: SGS_BeginGameWithDeposits

This call is a combination of two calls, namely the SGS_Deposit and SGS_BeginGame calls. The SGS_BeginGameWithDeposits call is created for efficiency purposes. The order of execution is as follows: deposits are made to Session buckets; validation is performed for sufficient funds to start a system game; required funds are debited from player Session buckets; game history id (HID) is created; and HID and current Session buckets' balances are returned to iVIEW 26.

The following tables list exemplary request and response parameters associated with the SGS_BeginGameWithDeposits web service call and their corresponding purpose and type/range.

|  | Purpose | Type/Range |
|---|---|---|
| Request Parameter Name |  |  |
| depositNumber | Deposit counter number | Int |
| depositBuckets | An array of buckets. Each bucket contains |  |
|  | prizeTypeId | Int |
|  | jurisdiction | True/False |
|  | TRX_Value | Decimal |
|  | Balance | Decimal |
| gamePlayObj | GamePlay object - see SGS_BeginGame call |  |

|  | Purpose | Type/Range |
|---|---|---|
| Response Parameter Name |  |  |
| DepositAck | SGS_Deposit_Ack object - this object contains everything that a normal SGS_Deposit call would return |  |
| BeginGameAck | SGS_BeginGameAck object - this object contains everything that a normal SGS_BeginGame call would return |  |

Web Service: SGS_ProcessTournamentIntermediateScore

This call is used by the player interface unit 26 in the event that a tournament game requires a server-side intermediate tournament score calculation. The scoring algorithms vary based on a XML settings files on the rewards server 12. The following table lists exemplary request and response parameters associated with the SGS_ProcessTournamentIntermediateScore web service call and their corresponding purpose and type/range.

|  | Purpose | Type/Range |
|---|---|---|
| Request Parameter Name |  |  |
| bgDataArray | Array of BaseGameTournamentData objects. Each BaseGameTournamentData object contains: |  |
|  | GameComboID (a combination of Game Theme, Paytable ID and denomination) | 10-30 characters |
|  | PlayerCardNo | 0-20 characters |
|  | SessionID | Int |
|  | HID | Int |
|  | GID | Int |
|  | CreditValue (in pennies) | Long |
|  | PayoutPercent (100-based number) | Decimal |
|  | AmountBet | Long |
|  | AmountWon | Long |
|  | MeterValidationCode | Int |
|  | GamesPlayed | Long |
|  | MaxBet | Long |
|  | StartTime | DateTime |
|  | EndTime | DateTime |
|  | GameLengthMS | Long |
|  | JackpotWon | Long |
|  | AveTimeBetweenGamesMS | Long |
|  | TotalMaxBets | Long |
|  | BaseGameHID | Int |
|  | TournInstID | Long |
|  | TournGameTimeElapsedMS | Long |
|  | TimeBetweenGamesMS | Long |
|  | HasTournEnded | True/False |
| Response Parameter Name |  |  |
| Score | Cumulative intermediate tournament score | Decimal |
| ScoreContribution | Contribution from this call to total tournament score | Decimal |
| Rank | Rank of current intermediate score against tournament leader board | Int |
| BaseGameHID | Unique base game ID for this system game HID (usually, BaseGameHIDs are sequential from 1 to X, where X is a total number of base games required to be played to complete this system game in iVIEW). | Int |

-continued

| | Purpose | Type/Range |
|---|---|---|
| LeaderBoardData | Serialized leader board XML data for current tournament | 0-400 characters |
| HasTournamentGameEnded | Signifies the completion of tournament game | True/False |
| Result | Call result: 0 - success, non-zero - failure | Int |
| errorString | Error description | 0-1000 characters |

Web Service: SGS_EndGame

This web service call closes the Game transaction for a specified HID and stores the bucket transaction values into player session buckets in the event of a system game win. For tournament games, this call also performs processing of score for an associated tournament (e.g., tournInstID field in the Gameplay object). Additionally, the system game's score is processed and put on the tournament's leader board (if score qualifies). The following tables list exemplary request and response parameters associated with the SGS_EndGame web service call and their corresponding purpose and type/range.

| | Purpose | Type/Range |
|---|---|---|
| Request Parameter Name | | |
| GamePlay | Gameplay object - see SGS_BeginGame call | |
| Response Parameter Name | | |
| HID | Game play History Id | |
| Buckets | An array of buckets. Each bucket contains | |
| | prizeTypeId | Int |
| | jurisdiction | True/False |
| | TRX_Value | Decimal |
| | balance | Decimal |
| Result | Call result: 0 - success, non-zero - failure | Int |
| errorString | Error description | 0-1000 characters |

Web Service: SGS_StartHandpay

This web service initiates a new iVIEW hand pay transaction. This web service also returns a Hand pay ID with the bucket values in order to send a message to the casino cage. The following tables list exemplary request parameters, SGS Hand Pay members, and response parameters associated with the SGS_StartHandpay web service call and their corresponding purpose and type/range.

| | Purpose | Type/Range |
|---|---|---|
| Request Parameter Name | | |
| SGSHandPay object | See below | |
| SGSHandPay members | | |
| HPId | Unique ID of a hand pay | |
| HPTypeId | Hand pay Type (Jurisdiction or player initiated) | Int |

-continued

| | Purpose | Type/Range |
|---|---|---|
| SessionId | Player Current Session Id | Int |
| IviewId | Machine address of a iVIEW device | 0-50 characters |
| CasinoId | Property Id | 0-4 characters |
| GmuId | Machine address of a device | 0-32 characters |
| AssetNo | Account number of a device | 0-8 characters |
| PLRCardNo | Player card number | 0-20 characters |
| CompletedBy | Employee card number | 0-20 characters |
| Status | Status of this hand pay | Int |
| Buckets | Array of Buckets. each bucket contains | |
| | prizeTypeId | Int |
| | jurisdiction | True/False |
| | TRX_Value | Decimal |
| | balance | Decimal |
| Response Parameter Name | | |
| HPID | Hand pay ID | Int |
| Result | Call result: 0 - success, non-zero - failure | Int |
| errorString | Error description | 0-1000 characters |

Web Service: SGS_EndHandpay

This web service call closes the Hand pay transaction for the request hand pay ID. This is normally done when an employee has been identified and is paying the patron. In another embodiment, a casino employee or the patron may cancel a hand pay. The following tables list exemplary request and response parameters associated with the SGS_EndHandpay web service call and their corresponding purpose and type/range.

| | Purpose | Type/Range |
|---|---|---|
| Request Parameter Name | | |
| iviewId | Machine address of a iVIEW device | 0-50 characters |
| playerCardNumber | Player card number | 0-20 characters |
| sessionID | Player Current Session Id | Int |
| handPayID | Hand pay Id | Int |
| isCommit | Commit the transaction or not | True/False |
| completedBy | Employee card number | 0-20 characters |
| Response Parameter Name | | |
| HPID | Hand pay ID | |
| Result | Call result: 0 - success, non-zero - failure | 0 or non-negative |
| errorString | Error description | 0-1000 characters |

Web Service: SGS_CloseSession

This web service call closes the specified player session on the specified iVIEW 26 and moves all the balances from the player's Session buckets into the Player's Master buckets. As a result, all player funds are available for any new session created for the same player card number. Additionally, the player interface unit 26 will close any previously opened sessions after re-powering. The following tables list exemplary request and response parameters associated with the SGS Close Session web service call and their corresponding purpose and type/range.

|  | Purpose | Type/Range |
|---|---|---|
| Request Parameter Name |  |  |
| iviewId | Machine address of a iVIEW device | 0-50 characters |
| plrCardNo | Player Card Number | 0-20 characters |
| sessionId | Session Number | Int |
| recoveryYN | Recovery session or normal | True/False |
| Response Parameter Name |  |  |
| Result | Call result: 0 - success, non-zero - failure | 0 or 1 |
| errorString | Error description | 0-1000 characters |

Web Service: SGS_EGMGamePlay

This web service call posts game play activity data from and EGM 20 into the BLRS 12. For example, values such as, but not limited to, total coin in, total coin out, number of games played are posted to the rewards server 12. This data will be posted on every "heart beat" call to the server, before SGS_CreateSession, and before SGS_CloseSession calls. The following tables list exemplary request and response parameters associated with the SGS_EGM GamePlay web service call and their corresponding purpose and type/range.

|  | Purpose | Type/Range |
|---|---|---|
| Request Parameter Name |  |  |
| iviewId | Machine address of a iVIEW device | 0-50 characters |
| assetId | Account number of a device | 0-20 characters |
| sessionId | Session Number | Int |
| totCoinIn | Total coin in | Int |
| totCoinOut | Total coin out | Int |
| gamesPlayed | No of games played | Int |
| Status | Status of the device at the time of posting data | 0 = None<br>1 = Session Open<br>2 = Session in progress<br>3 = Session Closed |
| Response Parameter Name |  |  |
| result | Call result: 0 - success, non-zero - failure | 0 or 1 |
| errorString | Error description | 0-1000 characters |

Web Service: SGS_QueryWithdrawals

This web service call returns the withdrawal transaction Log for a requested iVIEW 26 and prize type. This data is shown on employee pages on iVIEW 26. The following tables list exemplary request and response parameters associated with the SGS Query Withdrawals web service call and their corresponding purpose and type/range.

|  | Purpose | Type/Range |
|---|---|---|
| Request Parameter Name |  |  |
| iviewId | Machine address of a iVIEW device | 0-50 characters |
| prizeType | Prize type | Int |
| noofRecords | No-Of records to return | Int |
| Response Parameter Name |  |  |
| Withdrawal_Report | Array of Withdrawal_Report object. Each Withdrawal_Report contains |  |
|  | tranId | Int |
|  | sessionId | Int |
|  | session_TrxId | Int |
|  | plrCardNo | 0-20 characters |
|  | sourceId | 0-50 characters |
|  | tranDateTime | Date time |
|  | prizeValue | Decimal |
|  | jurisdiction | True/False |
|  | status | 0-20 characters |
| Result | Call result: 0 - success, non-zero - failure | Int |
| errorString | Error description | 0-1000 characters |

Web Service: SGS_QueryGamePlayLog

This web service call returns the Game play history transactions for a requested iVIEW 26. The requested data is shown on employee pages on the iVIEW 26. The following tables list exemplary request and response parameters associated with the SGS Query Game Play Log web service call and their corresponding purpose and type/range.

|  | Purpose | Type/Range |
|---|---|---|
| Request Parameter Name |  |  |
| iviewId | Machine address of a iVIEW device | 0-50 characters |
| noofRecords | No-Of records to return | Int |
| Response Parameter Name |  |  |
| GamePlay_Report | Array of Gameplay_Report object. Each Gameplay_Report contains |  |
|  | HID | Int |
|  | GID | Int |
|  | IviewId | 0-50 characters |
|  | plrCardNo | 0-20 characters |
|  | sessionId | Int |
|  | casinoId | 0-4 characters |
|  | gmuId | 0-32 characters |
|  | assetNo | 0-8 characters |
|  | startDateTime | Date time |
|  | endDateTime | Date time |
|  | payTabSetId | Int |
|  | payTabId | Int |
|  | gameSettingsId | Int |
|  | score | Int |

|  | Purpose | Type/Range |
|---|---|---|
|  | buckets Spent | Bucket values |
|  | buckets Won | Bucket values |
| Result | Call result: 0 - success, non-zero - failure | Int |
| errorString | Error description | 0-1000 characters |

Web Service: SGS_QueryHandpayLog

This web service call returns the hand pay transactions for the requested iVIEW 26. The requested data is shown on employee pages on the iVIEW 26. The following tables list exemplary request and response parameters associated with the SGS Query Hand Pay Log web service call and their corresponding purpose and type/range.

|  | Purpose | Type/Range |
|---|---|---|
| Request Parameter Name |  |  |
| iVIEW Id | Machine address of a iVIEW device | 0-50 characters |
| noofRecords | No-Of records to return | Int |
| Response Parameter Name |  |  |
| HandPay_Report | Array of HandPay_Report object. Each HandPay_Report contains |  |
|  | HPID | Int |
|  | HPDesc | 0-50 characters |
|  | IviewId | 0-50 characters |
|  | plrCardNo | 0-20 characters |
|  | sessionId | Int |
|  | casinoId | 0-4 characters |
|  | gmuId | 0-32 characters |
|  | assetNo | 0-8 characters |
|  | createdDateTime | Date time |
|  | completedDateTime | Date time |

|  | Purpose | Type/Range |
|---|---|---|
|  | completedBy | 0-20 characters |
|  | buckets | Bucket values |
| Result | Call result: 0 - success, non-zero - failure | Int |
| errorString | Error description | 0-1000 characters |

Web Service: SGS_GetPrizeTypes

This web service call returns all available prize types. This call does not require any parameters. [Bryan, is this correct?] The following table lists exemplary response parameters and their corresponding purpose and type/range.

| Response Parameter Name | Purpose | Type/Range |
|---|---|---|
| Result | Call result: 0 - success, non-zero - failure | 0 or 1 |
| errorString | Error description | 0-1000 characters |
| AllPrizeTypes | Array of SGSPrizeType objects. Each SGSPrizeType object contains: |  |
|  | PrizeTypeID | Int |
|  | Description | 0-20 characters |
|  | RateToDollar | Decimal |
|  | IsJurInclude - this determines whether this type of prize should be considered as a part of jurisdictional trigger and cause a hand pay. | True/False |

Bally Live Rewards Tournament Web Services

In addition to messages defined above, a player interface unit 26 loads a series of html pages from the player rewards server 12 for tournament system games. In turn, these tournament pages on the player interface unit 26 bring dynamic data from BLRS Tournament Web Services using AJAX technology. The following table lists the web service methods that are provided by the BLRS Tournament Web Services.

| Name | Purpose |
|---|---|
| GetActiveTournaments | Returns active tournaments for given Session and GID |
| GetTournamentInstance | Returns all win positions for given tournament instance |
| GetTournamentInstanceInfo | Returns more compact tournament instance data |
| GetTournamentInstanceLeaderBoard | Returns tournament instance leader board |
| GetTournamentInstanceLeaderBoard_WithSession | Returns tournament instance leader board with additional data for a player session |
| GetMyTournaments | Returns information about completed tournaments played by a player identified by a player session |
| GetMyTournamentInstanceResults | Returns tournament instance leader board with entries pre-filtered for a particular player. Also, includes player's best scores that failed to achieve a position on the leader board. |
| GetPlayerAliases | Returns a list of player aliases that can be used for a tournament game |
| GetTournamentGlobalSettings | Returns global settings for tournament games on BLRS |

| Name | Purpose |
|---|---|
| BindDefaultAliasToSession | Binds specified alias to specified session |
| BindAliasToSession | Binds default alias to a specified session |
| UnBindAliasFromSession | Un-binds an alias from specified session |
| GetPlayerRank | Returns current rank for a player identified by a session for a specified tournament instance |
| GetPlayerTournamentInstances | Returns tournament instances for tournaments that a specified player participated in |
| HasPlayerPlayedTournamentInstance | Returns true if a player played a tournament, false otherwise |
| ReserveTournamentGame | Checks if a player can start a tournament game and reserves a game for him before an actual SGS_BeginGame call is made |
| GetCurrentTournaments | Returns currently active and recently finished tournament. Used by signage. |
| GetTournamentInstanceLeaderBoard_ForSignage | Returns leader board for a tournament. Used by signage. |

Each system tournament game, such as "Casino Challenge" and "Blazing 7s Challenge," has different game architecture. A system tournament game is uniquely identified by a TournID (Tournament ID) and is linked to a tournament system game (GID). When each Tournament (TournID) is executed (i.e., started, processed (accepting score), and completed (winnings distributed)), the Tournament is represented by a particular Tournament Instance (TournInstID). In other words, the Tournament Instance is a Tournament executed at certain time. In most embodiments, multiple Tournament Instances (TournInstIDs) are linked to a single Tournament (TournID).

For the following web services, the value of TournInstID is used to uniquely identify a Tournament Instance. Also, for the sake of simplicity, the terms "Tournament" and "Tournament Instance" may be used interchangeably.

Web Service: GetActiveTournaments

This web service call returns an XML document with all active tournaments of specified tournament game (GID) that are available for a specified SessionID. A player's session with the BLRS 12 allows for lookup of player's level and association with any Invite Lists. According to one embodiment, a player is eligible for a tournament if the player has a predefined player rank/level or the player is included on an Invite List. The following tables list exemplary request and response parameters associated with the Get Active Tournaments service call and their corresponding purpose and type/range.

| | Purpose | Type/Range |
|---|---|---|
| Request Parameter Name | | |
| SessionID | Unique ID for player's session with BLRS | Int |
| GID | Unique ID of a system game on BLRS | Int |
| Response Parameter Name | | |
| XmlDocument | XML document contains the list of Tournament Instance nodes. Each Tournament Instance contains: | |
| | TournInstID - unqiue ID of a running tournament | Int |
| | TournName - display name of tournament | 0-50 characters |
| | TournTypeID - (1)Timed, (2) Limited Entry | Int |
| | RewardLevel - Play Points cost of this tournament | Int |
| | PrizeValue - Total value of prize(s) of certain type | Decimal |
| | PrizeTypeID - Prize Type ID used in PrizeValue | Int |
| | IsMultiplePrizes | |
| | IsProgressive - tournamnet prizes could be fixed or progressive | True/False |
| | EndDT - DateTime of tournament completion (for Timed) | True/False |
| | NumberOfEntries - Number of entries (for Limited Entry) | DateTime |
| | NumberOfWinPositions | Int |

| Purpose | Type/Range |
|---|---|
| IsSameCard - used to let player know that he played this tournament before | Int |
| One or many G2SAttribute nodes. These attributes specify tournament start and/or end conditions, etc. | True/False |
| Each G2SAttribute contains one or many | |
| AttribID | Int |
| AttribValue | 0-20 characters |

Web Service: GetTournamentInstance

This service call returns all win positions for specific tournament instance. The following tables list exemplary request and response parameters associated with the service call and their corresponding purpose and type/range.

| | Purpose | Type/Range |
|---|---|---|
| Request Parameter Name | | |
| TournInstID | Unique Id of a tournament instance | Int |
| Response Parameter Name | | |
| XmlDocument | XML document contains the list of win positions with all prizes attached to them. | |

| Purpose | Type/Range |
|---|---|
| Each win position contains one or many Prize nodes. Each Prize node contains: | |
| PrizeTypeID | Int |
| PrizeValue | Decimal |

Web Service: GetTournamentInstanceInfo

This web service call returns more compact information about a specific tournament instance. The following tables list exemplary request and response parameters associated with the service call and their corresponding purpose and type/range.

| | Purpose | Type/Range |
|---|---|---|
| Request Parameter Name | | |
| TournInstID | Unique Id of a tournament instance | Int |
| Response Parameter Name | | |
| XmlDocument | XML document contains the following nodes: | |
| | Info - the display name of a Tournament Instance | 0-20 characters |
| | Reward Level - Play Points cost of this tournament | Int |
| | Status - 0: active, 1: pending, 2: complete | Int |
| | One or many G2SAttribute nodes. These attributes specify tournament start and/or end conditions, etc. | |
| | Each G2SAttribute contains one or many | |
| | AttribID | Int |
| | AttribValue | 0-20 characters |

Web Service: GetTournamentInstanceLeaderBoard

This web service call returns leader board information for specified tournament instance. The following tables list exemplary request and response parameters associated with the service call and their corresponding purpose and type/range.

|  | Purpose | Type/Range |
| --- | --- | --- |
| Request Parameter Name |  |  |
| TournInstID | Unique Id of a tournament instance | Int |
| ShowAllPrizesYesNow | Flags whether all prizes should be returned | True/False |
| Response Parameter Name |  |  |
| XmlDocument | XML document contains one or many WinPosition nodes. Each WinPosition node contains: |  |
|  | Rank - the rank of a win position for the leader board | Int |
|  | Alias - alias of a player holding this position or "Available" if a position is not taken | 0-20 characters |
|  | Score - the score achieved by a player to obtain this position | Int |
|  | One or many Prize nodes with following fields: |  |
|  | PrizeTypeID | Int |
|  | PrizeValue | Decimal |

Web Service: GetTournamentInstanceLeaderBoard_WithSession

This web service call returns leader board information with player specific data for specified tournament instance and an active player session. The following tables list exemplary request and response parameters associated with the service call and their corresponding purpose and type/range.

|  | Purpose | Type/Range |
| --- | --- | --- |
| Request Parameter Name |  |  |
| TournInstID | Unique Id of a tournament instance | Int |
| ShowAllPrizesYesNow | Flags whether all prizes should be returned | True/False |
| SessionID | Identifies unique player session | Int |
| Response Parameter Name |  |  |
| XmlDocument | XML document contains one or many WinPosition nodes. Each WinPosition node contains: |  |
|  | Rank - the rank of a win position for the leader board | Int |
|  | Alias - alias of a player holding this position or "Available" if a position is not taken | 0-20 characters |
|  | Score - the score achieved by a player to obtain this position | Int |
|  | One or many Prize nodes with following fields: |  |
|  | PrizeTypeID | Int |
|  | PrizeValue | Decimal |
|  | IsSameCard - identifies if this position occupied by the player who opened provided SessionID | True/False |
|  | IsBestScore - identifies if if the Score for this position is the best score for this player (this is meaningful only if IssameCard is 'True') | True/False |

Web Service: GetMyTournaments

This service call returns information about completed tournaments played by a player identified by a player session. The following tables list exemplary request and response parameters associated with the service call and their corresponding purpose and type/range.

|  | Purpose | Type/Range |
|---|---|---|
| Request Parameter Name | | |
| SessionID | Identifies unique player session | Int |
| GID | BLRS system game ID | |
| Response Parameter Name | | |
| XmlDocument | XML document contains none or some TournamentInstance nodes. Each TournamentInstance node contains: | |
| | TournInstID - unique ID of a running tournament | Int |
| | TournName - display name of tournament | 0-20 characters |
| | Ended - date and time the tournament ended | DateTime |
| | IsWinner - identifies whether a player won the tournament | True/False |
| | PrizeValue - total prize value a tournament | Decimal |
| | Rank - the highest rank achieved by a player in this tournament | Int |

Web Service: GetMyTournamentInstanceResults

This service call returns tournament instance leader board with entries pre-filtered for a particular player. Also, this service call includes player's best scores that failed to achieve a position on the leader board. The following tables list exemplary request and response parameters associated with the service call and their corresponding purpose and type/range.

|  | Purpose | Type/Range |
|---|---|---|
| Request Parameter Name | | |
| TournInstID | Unique Id of a tournament instance | Int |
| ShowAllPrizesYesNow | Flags whether all prizes should be returned | True/False |
| SessionID | Identifies unique player session | Int |
| Response Parameter Name | | |
| XmlDocument | XML document contains one or many WinPosition nodes. Each WinPosition node contains: | |
| | Rank - the rank of a win position for the leader board | Int |
| | Alias - alias of a player holding this position or "Available" if a position is not taken | 0-20 characters |
| | Score - the score achieved by a player to obtain this position | Int |
| | One or many Prize nodes with following fields: | |
| | PrizeTypeID | Int |
| | PrizeValue | Decimal |

Web Service: GetPlayerAliases

This service call returns a list of player aliases that can be used for a tournament game. The following tables list exemplary request and response parameters associated with the service call and their corresponding purpose and type/range.

|  | Purpose | Type/Range |
|---|---|---|
| Request Parameter Name | | |
| SessionID | Identifies unique player session | Int |
| Response Parameter Name | | |
| XmlDocument | XML document contains the following nodes: | |
| | Result - 0: success, not 0: failure | Int |
| | ErrorString - error description | 0-5-characters |
| | Multiple AliasEntry nodes with these fields: | |
| | Alias - player alias | 0-20 characters |
| | IsActive - signifies whether this alias is in use now | True/False |

Web Service: GetTournamentGlobalSettings

This service call returns global settings for tournament games on BLRS 12. The following tables list exemplary request and response parameters associated with the service call and their corresponding purpose and type/range.

|  | Purpose | Type/Range |
|---|---|---|
| Request Parameter Name | | |
| None | | |
| Response Parameter Name | | |
| XmlDocument | XML document contains the following elements: | |
| | Result - 0: success, not 0: failure | Int |
| | ErrorString - error description | 0-50 characters |
| | IsAutoPlay - identifies whether a tournament game will automatically start on iVIEW in case of player inactivity | True/False |
| | AutoPlayDelay - if IsAutoPlay is True, specifies the delay in seconds before a game will start | Int |

Web Service: BindDefaultAliasToSession

This service call binds a default (first available) player alias to player's session. The following tables list exemplary request and response parameters associated with the service call and their corresponding purpose and type/range.

|  | Purpose | Type/Range |
|---|---|---|
| Request Parameter Name | | |
| SessionID | Identifies unique player session | Int |
| Response Parameter Name | | |
| XmlDocument | XML document contains the following elements: | |
| | Result | True/False |

Web Service: BindAliasToSession

This service call binds an alias to a session. The player alias is needed for the tournament games managed by rewards server 12 because the player needs to be representable on a tournament leader board. According to one embodiment, a player may have multiple aliases associated with his player account. The multiple aliases allows multiple people with the same player account number to play independently in different tournaments at the same time or even compete with each other in the same tournament. The following tables list exemplary request and response parameters associated with the service call and their corresponding purpose and type/range.

|  | Purpose | Type/Range |
|---|---|---|
| Request Parameter Name | | |
| SessionID | Identifies unique player session | Int |
| PLRAlias | Player alias | 0-20 characters |
| Response Parameter Name | | |
| XmlDocument | XML document contains the following elements: | |
| | Result | True/False |

Web Service: UnBindAliasFromSession

This service call unbinds an alias from a session. The following tables list exemplary request and response parameters associated with the service call and their corresponding purpose and type/range.

|  | Purpose | Type/Range |
|---|---|---|
| Request Parameter Name | | |
| SessionID | Identifies unique player session | Int |
| PLRAlias | Player alias | 0-20 characters |
| Response Parameter Name | | |
| XmlDocument | XML document contains the following elements: | |
| | Result | True/False |

Web Service: GetPlayerRank

This service call returns current rank for a player identified by a session for a specified tournament instance. The following tables list exemplary request and response parameters associated with the service call and their corresponding purpose and type/range.

|  | Purpose | Type/Range |
|---|---|---|
| Request Parameter Name | | |
| SessionID | Identifies unique player session | Int |
| TournInstID | Unique Id of a tournament instance | Int |
| Response Parameter Name | | |
| XmlDocument | XML document contains the following elements: | |
| | Rank - the highest rank for the player | Int |
| | HighestScore - the score for highest rank | Int |

-continued

| | Purpose | Type/Range |
|---|---|---|
| | PrizeTypeID - only if there is a prize for this rank | Int |
| | PrizeValue - only if there is a prize for this rank | Decimal |

Web Service: GetPlayerTournamentInstances

This service call returns tournament instances for those tournaments that a specified player was a participant. The following tables list exemplary request and response parameters associated with the service call and their corresponding purpose and type/range.

| | Purpose | Type/Range |
|---|---|---|
| Request Parameter Name | | |
| SessionID | Identifies unique player session | Int |
| Response Parameter Name | | |
| XmlDocument | XML document contains the following elements: | |
| | TournInstID - unque ID of a running tournament | Int |
| | TournName - display name of tournament | 0-20 characters |
| | Alias | 0-20 characters |
| | Started | DateTime |
| | Ended - date and time of tournament completion or "in progress" | DateTime |
| | No or some Prize elements containing: | |
| | PrizeTypeID | Int |
| | PrizeValue | Decimal |

Web Service: HasPlayerPlayedTournamentInstance

This service call returns a True/False result depending on whether a player played or not played a tournament instance. The following tables list exemplary request and response parameters associated with the service call and their corresponding purpose and type/range.

| | Purpose | Type/Range |
|---|---|---|
| Request Parameter Name | | |
| SessionID | Identifies unique player session | Int |
| TournInstID | Unique Id of a tournament instance | Int |
| Response Parameter Name | | |
| XmlDocument | XML document contains the following elements: | |
| | Result | True/False |

Web Service: ReserveTournamentGame

This service call checks if a player can start a tournament game. If the player is eligible, the service call reserves a game for the player before an actual SGS_BeginGame call is made. The following tables list exemplary request and response parameters associated with the service call and their corresponding purpose and type/range.

| | Purpose | Type/Range |
|---|---|---|
| Request Parameter Name | | |
| SessionID | Identifies unique player session | Int |
| TournInstID | Unique Id of a tournament instance | Int |
| Response Parameter Name | | |
| Result | 0: success; not 0: failure | Int |
| ErrorString | Error description | 0-50 characters |

Web Service: GetCurrentTournaments

This service call returns active and recently finished tournament data. This call is typically used by tournament signage that is strategically located within a gaming establishment or is otherwise associated with gaming machines 20 capable of presenting a system-based tournament game. The following tables list exemplary request and response parameters associated with the service call and their corresponding purpose and type/range.

| | Purpose | Type/Range |
|---|---|---|
| Request Parameter Name | | |
| TournTypeID | 1: timed, 2: limited entry | Int |
| Response Parameter Name | | |
| XmlDocument | XML document contains the list of Tournament Instance nodes. Each Tournament Instance contains: | |
| | TournInstID - unque ID of a running tournament | Int |
| | TournName - display name of tournament | 0-20 characters |
| | CardType - availability for certain player levels to participate | 0-20 characters |
| | Status - this field holds different type of information depending on the type of a tournament. For timed tournaments, it contains a string representing tournament status e.g.: "Open - Play Now!" or "Pending . . . " etc. For a limited entry tournament, this field is appended with information regarding the of slots open for the tournament e.g.: "7 Slots Open - Play Now!" | 0-20 characters |

| Purpose | Type/Range |
|---|---|
| Ends - this field is used only for timed tournaments and contains a date and time of tournament completion | DateTime |
| One or multiple Prize nodes with total prize value for each prize type: | |
| PrizeValue | Decimal |
| PrizeTypeID | Int |
| IsProgressive - true if it's a progressive tournament, false otherwise | True/False |
| TotalPayouts - number of win positions on leader board | Int |
| StatusID - id for the Status field | Int |
| DisplayTime - how many seconds this tournament data should be displayed on signage | Int |

Web Service: GetTournamentInstanceLeaderBoard_ForSignage

This service call returns a leader board for a tournament and is typically used by signage. This service call is similar to the GetTournamentInstanceleaderBoard service call with the exception that the GetTournamentInstanceLeaderBoard_ForSignage call applies additional signage-specific business logic such as, but not limited to, limiting number of rows or columns. [Bryan, additional explanation necessary?] The following tables list exemplary request and response parameters associated with the service call and their corresponding purpose and type/range.

| | Purpose | Type/Range |
|---|---|---|
| Request Parameter Name | | |
| TournInstID | Unique Id of a tournament instance | Int |
| ShowAllPrizesYesNow | Flags whether all prizes should be returned | True/False |
| Response Parameter Name | | |
| XmlDocument | XML document contains one or many WinPosition nodes. Each WinPosition node contains: | |
| | Rank - the rank of a win position for the leader board | |
| | Alias - alias of a player holding this position or "Available" if a position is not taken | |
| | Score - the score achieved by a player to obtain this position | |
| | One or many Prize nodes with following fields: | |
| | PrizeTypeID | |
| | PrizeValue | |

While the example embodiments have been described with relation to a gaming environment, it will be appreciated that the above concepts can also be used in various non-gaming environments. For example, such rewards can be used in conjunction with purchasing products, e.g., gasoline or groceries, associated with vending machines, used with mobile devices or any other form of electronic communications. Accordingly, the disclosure should not be limited strictly to gaming.

The various embodiments described above are provided by way of illustration only and should not be construed to limit the claimed invention. Those skilled in the art will readily recognize various modifications and changes that may be made to the claimed invention without following the example embodiments and applications illustrated and described herein, and without departing from the true spirit and scope of the claimed invention, which is set forth in the following claims.

What is claimed:

1. A gaming system, comprising:
a game server connected to a physical game network that provides a network-based game;
a plurality of gaming devices that are connected to the physical game network, each gaming device including a base game display and a base game processor, the network-based game being presented on the base game display using the base game processor, and each gaming device including a secondary device having a secondary display and a secondary processor, the secondary device being operatively associated with the gaming device, and the secondary device enabling, via the tournament server, a player to play a tournament game that is presented amongst one or more of the plurality of gaming devices; and
a tournament server that is connected to the plurality of gaming devices via the physical game network, the tournament server in communication with the secondary device using web service protocols, wherein the tournament server increments a tournament counter in response to play of the base game, presented on the base game display, based on one or more accrual rules specifying an event, an increment value, and an occurrence counter, wherein the tournament counter initiates play of the tournament game, presented on the secondary game display, when the tournament counter reaches a predetermined value, and wherein the tournament server sends and receives player-related data and tournament-related data to and from one or more of the secondary devices participating in the tournament game;

wherein the occurrence counter specifies, using the tournament server, the number of times the event must occur before the tournament counter is incremented by the increment value, and wherein the increment value varies based on the event.

2. The gaming system of claim 1, further comprising a plurality of game monitoring units associated with the plurality of gaming devices, each game monitoring unit monitoring base game play data.

3. The gaming system of claim 1, further comprising player tracking devices associated with each of the plurality of gaming machines.

4. The gaming system of claim 1, wherein the web service protocol is hypertext transfer protocol or hypertext transfer protocol over secure socket layer.

5. The gaming system of claim 1, wherein player-related data is player rank, player identification, player alias, player account data, or a combination thereof.

6. The gaming system of claim 1, wherein tournament-related data is a paytable, tournament scores, tournament leader board, threshold counter for tournament game start, tournament rules, available tournament games, game settings, game objects, or any combination thereof.

7. The gaming system of claim 1, wherein the event includes max bet for the base game.

8. The gaming system of claim 1, wherein a first accrual rule includes a first increment value associated with a first event corresponding to a max bet, and a second accrual rule includes a second increment value associated with a second event corresponding to a bet less than the max bet such that the first increment value is greater than the second increment value.

9. A player interface unit operatively associated with a networked gaming device including a gaming processor for controlling a base game and a game display for presenting the base game provided by a game server connected via a physical game network, the player interface unit comprising:
  a display screen for presenting information relating to a system-based, tournament game; and
  an embedded processor that employs an internal operating system and communicates with the gaming processor and a tournament server, the embedded processor in communication with the tournament server via the networked gaming device and the physical game network, the embedded processor reading incoming data from the tournament server,
  wherein the embedded processor communicates with the tournament server via web service protocols, wherein the tournament server increments a tournament counter in response to play of the base game, presented on the game display using the gaming processor, based on one or more accrual rules specifying an event, an increment value, and an occurrence counter,
  wherein the occurrence counter specifies, using the tournament server, the number of times the event must occur before the tournament counter is incremented by the increment value, and wherein the tournament counter initiates play of the tournament game, presented on the display screen, when the tournament counter reaches a predetermined value, wherein the increment value varies based on the event.

10. The player interface unit of claim 9, wherein the web service protocol is hypertext transfer protocol or hypertext transfer protocol over secure socket layer.

11. The player interface unit of claim 9, wherein the incoming data is game data and player data.

12. The player interface of claim 11, wherein game data is a paytable, tournament scores, tournament leader board, threshold counter for tournament game start, tournament rules, available tournament games, game settings, game objects, or any combination thereof.

13. The player interface of claim 11, wherein the player data is player rank, player identification, player alias, player account data, or a combination thereof.

14. The player interface unit of claim 9, wherein the event includes max bet for the base game.

15. The player interface unit of claim 9, wherein a first accrual rule includes a first increment value associated with a first event corresponding to a max bet, and a second accrual rule includes a second increment value associated with a second event corresponding to a bet less than the max bet such that the first increment value is greater than the second increment value.

16. A player interface unit operatively associated with a networked gaming device including a gaming processor for controlling a base game and a game display for presenting the base game provided by a game server connected via a physical game network, the player interface unit comprising:
  a display screen for presenting information relating to a system-based, tournament game; and
  an embedded processor that employs an internal operating system and communicates with the gaming processor and a tournament server, the embedded processor in communication with the tournament server via the networked gaming device and the physical game network, the embedded processor reading incoming data from the tournament server,
  wherein the embedded processor communicates with the tournament server via web service protocols, wherein the tournament server increments a tournament counter in response to play of the base game, presented on the game display using the gaming processor, based on one or more accrual rules specifying an event, an increment value, and an occurrence counter,
  wherein the occurrence counter specifies, using the tournament server, the number of times the event must occur before the tournament counter is incremented by the increment value, and wherein the tournament counter initiates play of the tournament game, presented on the display screen, when the tournament counter reaches a predetermined value, wherein the event includes max bet for the base game.

* * * * *